Jan. 15, 1946.  D. CURRIE  2,392,903
HITCH ATTACHMENT FOR TRACTORS
Filed Oct. 16, 1944
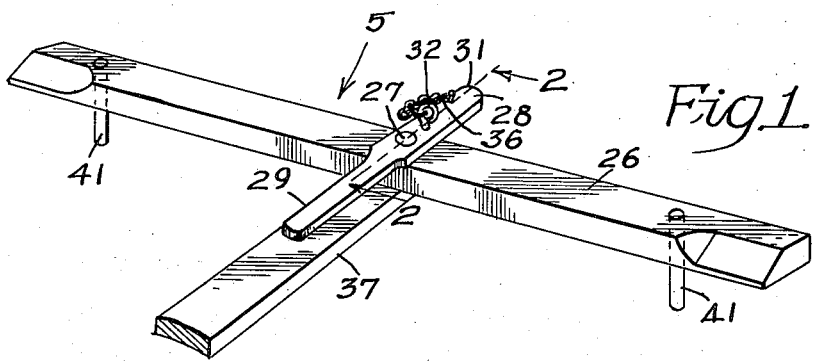
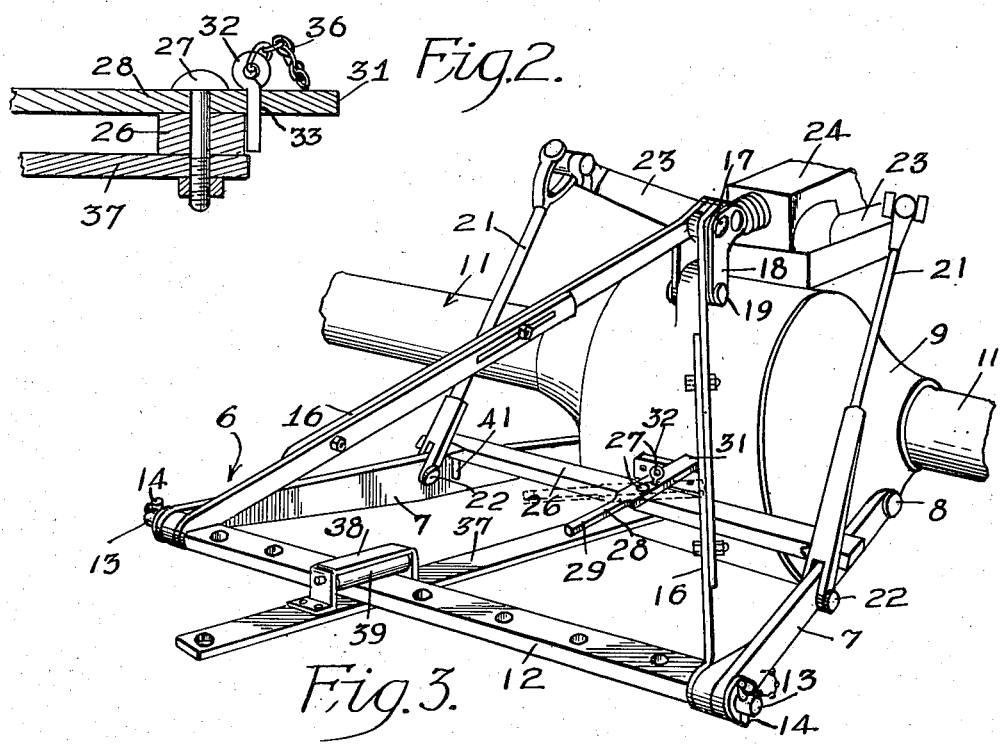
INVENTOR
DONALD CURRIE
by Rudolph L. Lowell
att'y Patented Jan. 15, 1946

2,392,903

UNITED STATES PATENT OFFICE 2,392,903

HITCH ATTACHMENT FOR TRACTORS

Donald Currie, Odebolt, Iowa

Application October 16, 1944, Serial No. 558,912

5 Claims. (Cl. 280—33.44)

This invention relates generally to tractor hitches and in particular to a hitch attachment for a tractor provided with what is commonly referred to as the "Ferguson" system for connecting farm implements with a tractor.

In one form of the Ferguson system a transverse draw bar is generally supported an appreciable distance behind the tractor rear axle housing. As a result when a farm implement is hitched to the draw bar much difficulty is encountered in making turns at the end of a field when working in plowed or loose ground due to the fact that the implement does not closely track behind the tractor. To overcome this difficulty hitch attachments have been provided for use with the Ferguson system but these attachments generally are bulky, relatively complicated, and not readily and easily assembled or removed from the tractor.

It is an object of this invention, therefore, to provide an improved tractor hitch.

A further object of this invention is to provide a hitch attachment which can be quickly and easily assembled on a tractor provided with the Ferguson system.

A feature of this invention is found in the provision of a hitch attachment which is capable of being connected with a tractor without the use of bolts, or the like, additional to those provided on the tractor.

Further objects, features and advantages of this invention will become apparent from the following description when taken in connection with the accompanying drawing in which:

Fig. 1 is a fragmentary perspective view of the hitch attachment of this invention;

Fig. 2 is a sectional view as seen on the line 2—2 in Fig. 1; and

Fig. 3 is a perspective view showing the hitch attachment in assembly relation with a tractor.

Referring to Fig. 3 of the drawing the attachment of this invention is indicated generally as 5 and shown in assembly relation with a frame 6, supported on a tractor, and forming part of a usual Ferguson system. The frame 6 comprises a pair of rearwardly extended diverging arms 7 having their front ends pivoted at 8 to opposite sides of a differential housing 9 constituting part of a rear axle housing 11. Connected between the rear ends of the members 7 is a draw bar 12 having reduced ends 13 extended through the members 7. The draw bar 12 is maintained in an assembly relation with the members 7 by a tapered keep 14 projected through the ends 13.

Pivotally supported at their rear ends on the draw bar 12 are a pair of brace bars 16, the forward ends of which are pivoted at 17 to a rocker arm 18, which in turn is pivoted at 19 to the top side of the differential housing 9. A pair of upright lifting arms 21 have their lower ends pivotally connected at 22 to a corresponding one of the frame members 7, while the upper ends of the lifting arms 21 are operatively connected with a crank arm 23 rotatably supported in a portion 24 of the tractor frame. The crank arm 23 is operatively associated with lifting mechanism (not shown) for raising and lowering the arms 21.

In the use of the hitch attachment 5 of this invention the frame 6 is maintained stationary so that the lifting arms 21 constitute upright frame members.

The hitch attachment comprises a transverse member 26 having a pivot bolt 27 extended therethrough at a position centrally between its ends. A pivoted lever arm 28 is pivoted on the bolt 27 to the top side of the member 26 and is formed at one end with a handle 29 and at its opposite end with a cam portion 31. When the lever arm 28 is in a pivotally moved position normal to the member 26, as shown in Fig. 1, its end portion 31 is extended forwardly of the member 26 for a purpose which will appear later. The lever arm 28 is locked in its normal position by an eye pin 32 receivable through an opening 33 formed in the lever arm 28 at a position such that the pin is adjacent to the front surface of the member 26 and in contact engagement with such surface. In order to keep the pin 32 from becoming lost there is provided a chain 36 attached at one end to the eye portion of the pin 32, and at its opposite end to the lever arm 28 adjacent the cam portion 31.

A hitch bar 37 is pivotally connected at its forward end with the pivot bolt 27 and to the bottom side of the transverse member 26. An upright inverted U-shaped bracket member 38 carried adjacent the rear end of the hitch bar 37 rotatably supports a roller 39 in a spaced relation with the top side of the hitch bar 37.

In the assembly of the hitch attachment 5 with the frame 6 the lever arm 28 is moved to its dotted line position shown in Fig. 3 and the member 26 is laid across the top sides of the rearwardly extended frame members 7 at a position forwardly of the upright arms or frame members 21. The member 26 is retained on the members 7 against longitudinal movement by a pin 41 spaced inwardly from each end of the member 26 and projected downwardly therefrom. The pins 41 are spaced a distance apart corresponding substantially to the distance between the frame members 7 at their junction with the frame members 21 so as to be engageable with the inner sides of the frame members 7 when the member 26 is in a moved position against the lower rear sides of the upright frame members 21.

With the member 26 thus supported on the frame members 7 one of the pins 14 is removed from the draw bar and the frame member 7 corresponding to such pin is sprung a distance away from the corresponding end 13 of the draw bar 12 a distance sufficient to receive the bracket 38 therethrough. The free end 13 of the draw bar 12 is then inserted within the bracket 38 between the roller 39 and the top side of the hitch bar 37. The sprung frame member 7 is then reassembled with the free end of the draw bar 12. The rear end of the hitch bar 37 is thus movably supported, through the roller 39, for swinging movement longitudinally of the draw bar 12 concurrently with being maintained in a plane substantially parallel with the plane of the draw bar.

With the hitch bar 37 thus assembled with the draw bar 12 the lever arm 28 is moved from its dotted line position shown in Fig. 3 to its full line position, also shown in Fig. 3, normal to the transverse member 26. At this normal position of the lever arm 28 the cam portion 31 is in engagement with the rear side of the differential housing 9, with the length of the lever arm between its pivot 27 and the cam portion 31 being such as to retain the member 26 against the rear sides of the upright frame members 21 and against forward movement away from such position. The pin 32 is then dropped within the hole 33 to retain the lever arm 28 against pivotal movement out of an engaging position with the differential housing 9.

It is seen, therefore, that the hitch bar is pivotally supported for swinging movement at a position adjacent the rear side of the axle housing 11 and forwardly of the draw bar 12. By virtue of this pivotal support of the hitch bar any farm implement connected therewith is capable of a proper tracking with the tractor when sharp or close turns are to be negotiated. It is also apparent that to assemble the hitch attachment 5 with the frame 6 it is only necessary to remove a single pin 14 to permit the insertion of the draw bar 12 within the bracket member 38 and that the removed pin is immediately replaced on completion of this assembly. A complete assembly can thus be accomplished in the manner of a few minutes without the requirement for bolts or nuts which might be readily lost or misplaced.

From a consideration of the above description, therefore, it is seen that the invention provides a hitch attachment for tractors which is of a simple and inexpensive construction, easily and quickly attachable with a tractor with a minimum of effort and time, and capable of providing for a proper tracking with the tractor of a farm implement connected therewith.

Although the invention has been described with respect to a preferred embodiment thereof it is to be understood that it is not to be so limited since modifications and changes can be made therein which are within the full intended scope of this invention as defined by the appended claims.

I claim:

1. In combination, a tractor having an axle housing, a frame supported on the tractor comprising a pair of rearwardly diverging frame members connected at their forward ends with said axle housing, a pair of upright frame members, each of which is supported at its lower end on a corresponding one of said diverging frame members and connected at its upper end to the tractor above said axle housing, a draw bar extended between the rear ends of said diverging frame members, a hitch attachment comprising a transverse member supported on said diverging frame members forwardly of said upright frame members, means retaining said transverse member against movement laterally of said diverging frame members, means adjustably supported on said transverse member and movable to engagement with said axle housing to hold said transverse member against the rear sides of said upright frame members, a hitch bar pivoted at its forward end on said transverse member for pivotal movement between said diverging frame members, and means movably supporting said hitch bar adjacent its rear end on said draw bar.

2. In combination, a tractor having an axle housing, a frame supported on said tractor comprising a pair of rearwardly extended bars connected at their forward ends adjacent the lower side of said housing, a pair of upright bars corresponding to said rearwardly extended bars connected at their upper ends to the tractor above said housing, a draw bar connected between the rear ends of said rearwardly extended bars, a hitch attachment including a transverse member supported on said rearwardly extended bars forwardly of said upright bars, with the ends of said transverse member being engageable with the rear sides of said upright bars, means for holding said transverse member against movement laterally of said rearwardly extended bars, movable means on said transverse member having a portion movable into abutting engagement with the rear side of said axle housing to hold said transverse member against the rear sides of said upright bars, a hitch bar pivoted adjacent its forward end on said transverse member, and means movably supporting said hitch bar adjacent its rear end on said draw bar.

3. A hitch attachment for a tractor comprising a transverse frame member, a lateral projection adjacent each end of said transverse frame member, pivot means extended through said transverse member intermediate the ends thereof, a hitch bar pivoted adjacent its forward end on said pivot means and to one side of said transverse member, a lever arm pivoted on said pivot means at the opposite side of said transverse member, said lever arm in one pivotally moved position normal to said transverse member having one end thereof extended forwardly of said transverse member, and means for locking said lever arm against pivotal movement in said normal position.

4. In combination, a tractor having an axle housing, a frame supported on the tractor comprising a pair of rearwardly extended frame members connected at their forward ends adjacent the lower side of said axle housing, an upright frame member carried on each said rearwardly extended frame members, a draw bar connected between the rear ends of said rearwardly extended frame members, a hitch attachment comprising a transverse member supported on the tops of said rearwardly extended frame members and against the lower rear sides of said upright frame members, means on said transverse member engageable with certain ones of said frame members to retain said transverse member against longitudinal movement when it is against said upright frame members, means movably supported on said transverse member and movable into engagement with said axle housing to hold said transverse member against said upright frame members, a hitch bar pivoted adjacent its forward end on said transverse member, and means movably supporting the rear end of the hitch bar on said draw bar.

5. In combination, a tractor having an axle housing, a frame supported on the housing comprising a pair of rearwardly extended frame members connected at their forward ends adjacent the lower side of said axle housing, an upright frame member on each said rearwardly extended frame members connected at its upper end to the tractor above said housing, a draw bar connected between the rear ends of said rearwardly extended frame members, a hitch attachment comprising a transverse member supported on the top surfaces of said rearwardly extended frame members forwardly of said upright frame members, and adapted to be moved to a position against the rear sides of said upright members, downward projections on said transverse member engageable with the inner sides of said rearwardly extended frame members to hold said transverse member against longitudinal movement in said one position, a pivoted lever arm pivotally supported on said transverse member having one end movable into engagement with the rear side of said axle housing to hold said transverse member against forward movement in said one position, means for locking said pivoted lever arm against pivotal movement in an engaged position with said axle housing, and a hitch bar pivoted at its forward end on said transverse member and having its rear end movably supported on said draw bar.

DONALD CURRIE.